United States Patent
Arnaud

(10) Patent No.: US 12,439,008 B2
(45) Date of Patent: Oct. 7, 2025

(54) PRIVACY-PRESERVING SURVEILLANCE CAMERA

(71) Applicant: STMicroelectronics International N.V., Geneva (CH)

(72) Inventor: Arthur Arnaud, Meylan (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/363,128

(22) Filed: Aug. 1, 2023

(65) Prior Publication Data

US 2025/0047818 A1  Feb. 6, 2025

(51) Int. Cl.
| H04N 7/18 | (2006.01) |
| G06F 21/84 | (2013.01) |
| G06V 20/52 | (2022.01) |
| G06V 40/10 | (2022.01) |
| H04N 23/45 | (2023.01) |
| H04N 23/611 | (2023.01) |

(52) U.S. Cl.
CPC ............ H04N 7/188 (2013.01); G06F 21/84 (2013.01); G06V 20/52 (2022.01); G06V 40/10 (2022.01); H04N 23/45 (2023.01); H04N 23/611 (2023.01)

(58) Field of Classification Search
CPC ...... H04N 7/188; H04N 23/45; H04N 23/611; G06F 21/84; G06V 20/52; G06V 40/10
See application file for complete search history.

(56) References Cited

U.S. PATENT DOCUMENTS

| 2017/0207949 A1 | 7/2017 | Donovan et al. |
| 2017/0289504 A1 | 10/2017 | Fridental et al. |
| 2021/0240851 A1 | 8/2021 | Badalone et al. |
| 2022/0116551 A1* | 4/2022 | Hiraishi ......... H04N 21/234345 |
| 2022/0270421 A1 | 8/2022 | Carter |
| 2023/0336682 A1* | 10/2023 | Ise ............................. G06T 5/50 |

OTHER PUBLICATIONS

Fuentes et al., "IndoorCare: Low-Cost Elderly Activity Monitoring System through Image Processing Sensors (Basel)." Sep. 9, 2021;21(18):6051. doi: 10.3390/s21186051. PMID: 34577256; PMCID: PMC8472621.
Kim et al., "Privacy-Preserving Visual Localization With Event Cameras," Published Dec. 8, 2022; https://arxiv.org/abs/2212.03177v2.

* cited by examiner

Primary Examiner — Alazar Tilahun
(74) Attorney, Agent, or Firm — Alston & Bird LLP

(57) ABSTRACT

An example apparatus, method, and computer program product for preserving privacy while capturing imagery data in a surveillance setting are provided. In some embodiments, the example apparatus includes an event-based capture mechanism and a standard illuminance capture mechanism, electrically connected to a controller. The event-based capture mechanism is configured to generate an event-based image, while the standard illuminance capture mechanism is configured to generate a standard illuminance image. The controller includes program code configured to cause the controller to receive, from the event-based capture mechanism, the event-based image, detect an object of interest in the event-based image, activate the standard illuminance capture mechanism based at least in part on a classification of the object of interest, and receive, from the standard illuminance capture mechanism, a standard illuminance image.

20 Claims, 11 Drawing Sheets

PRIVACY-PRESERVING SURVEILLANCE CAMERA

TECHNOLOGICAL FIELD

Embodiments of the present disclosure relate generally to preserving privacy while capturing imagery data on a surveillance camera, and more particularly, to utilizing an event-based and standard illuminance capture mechanism to preserve privacy in imagery data captured on a surveillance camera.

BACKGROUND

With the increased affordability and accessibility of surveillance technology, more and more individuals and businesses are installing surveillance cameras on their properties to deter criminal activities, enhance security, or monitor activities. Private surveillance cameras may be found outside offices, on doorbells at businesses and private residences, inside people's homes, and elsewhere. The increasing prevalence of private surveillance cameras has also raised concern over privacy. For instance, capturing activity on another person's private property, even if captured inadvertently, may be deemed an invasion of privacy. In addition, imagery from private surveillance cameras may be susceptible to hackers, enabling others to view imagery from within a private home or business.

Applicant has identified many technical challenges and difficulties associated with preserving privacy while capturing imagery data in a surveillance setting. Through applied effort, ingenuity, and innovation, Applicant has solved problems related to preserving privacy during the capture of imagery data in a surveillance setting by developing solutions embodied in the present disclosure, which are described in detail below.

BRIEF SUMMARY

Various embodiments are directed to an example apparatus, computer-implemented method, and computer program product for preserving privacy while capturing imagery data in a surveillance setting.

An example apparatus for preserving privacy while capturing imagery data in a surveillance setting is provided. In some embodiments, the example apparatus comprises an event-based capture mechanism, configured to generate an event-based image, electrically connected to a controller. The example apparatus further comprises a standard illuminance capture mechanism, configured to generate a standard illuminance image, electrically connected to the controller. In some embodiments, the controller comprises at least one processor and at least one memory including program code, the at least one memory and the program code configured to, with the at least one processor, cause the controller to at least: receive, from the event-based capture mechanism, the event-based image; detect an object of interest in the event-based image; activate the standard illuminance capture mechanism, based at least in part on a classification of the object of interest; and receive, from the standard illuminance capture mechanism, a standard illuminance image.

In some embodiments, the apparatus further comprises an image capture device, comprising a housing, wherein the event-based capture mechanism and the standard illuminance capture mechanism are disposed within the housing of the image capture device.

In some embodiments, the controller is disposed within the housing of the image capture device.

In some embodiments, the example apparatus further comprises an image capture sensor comprising the event-based capture mechanism and the standard illuminance capture mechanism.

In some embodiments, the program code is further configured to cause the controller to generate an image capture stream comprising the event-based image and the standard illuminance image.

In some embodiments, at least a portion of the image capture stream is stored on an external server.

In some embodiments, an event-based resolution of the event-based image is less than a standard illuminance resolution of the standard illuminance image.

In some embodiments, the standard illuminance capture mechanism is activated in an instance in which the classification of the object of interest is a human.

In some embodiments, the program code is further configured to cause the controller to: determine a positional locale of the object of interest; and deactivate the standard illuminance capture mechanism based on the positional locale of the object of interest.

An example computer-implemented method for capturing imagery data in a surveillance setting is further provided. In some embodiments, the method comprises receiving, from an event-based capture mechanism, an event-based image; detecting an object of interest in the event-based image; activating a standard illuminance capture mechanism, based at least in part on a classification of the object of interest; and receiving, from the standard illuminance capture mechanism, a standard illuminance image.

In some embodiments, the computer-implemented method further comprises detecting an identifiable characteristic of the object of interest.

In some embodiments, the computer-implemented method further comprises obscuring the object of interest from the standard illuminance image, wherein the object of interest is obscured from the standard illuminance image based at least in part on the event-based image.

In some embodiments, the computer-implemented method further comprises deactivating the standard illuminance capture mechanism based at least in part on the identifiable characteristic of the object of interest.

In some embodiments, the computer-implemented method further comprises obscuring the object of interest from the event-based image.

In some embodiments, the computer-implemented method further comprises determining a positional locale of the object of interest; and deactivating the standard illuminance capture mechanism based on the positional locale of the object of interest.

In some embodiments, the computer-implemented method further comprises detecting an action of interest performed by the object of interest; and activating the standard illuminance capture mechanism, based at least in part on the action of interest.

A computer program product for preserving privacy when capturing imagery data is further provided. In some embodiments, the computer program product comprises at least one non-transitory computer-readable storage medium having computer-readable program code portions stored therein, the computer-readable program code portions comprising an executable portion configured to: receive, from an event-based capture mechanism, an event-based image; detect an object of interest in the event-based image; activate a standard illuminance capture mechanism, based at least in part on a classification of the object of interest; and receive, from the standard illuminance capture mechanism, a standard illuminance image.

In some embodiments, the computer program product further comprises detecting an identifiable characteristic of the object of interest, and deactivating the standard illuminance capture mechanism based at least in part on the identifiable characteristic of the object of interest.

In some embodiments, the computer program product further comprises determining a positional locale of the object of interest; and deactivating the standard illuminance capture mechanism based on the positional locale of the object of interest.

In some embodiments, the computer program product further comprises detecting an action of interest performed by the object of interest; and activating the standard illuminance capture mechanism, based at least in part on the action of interest.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
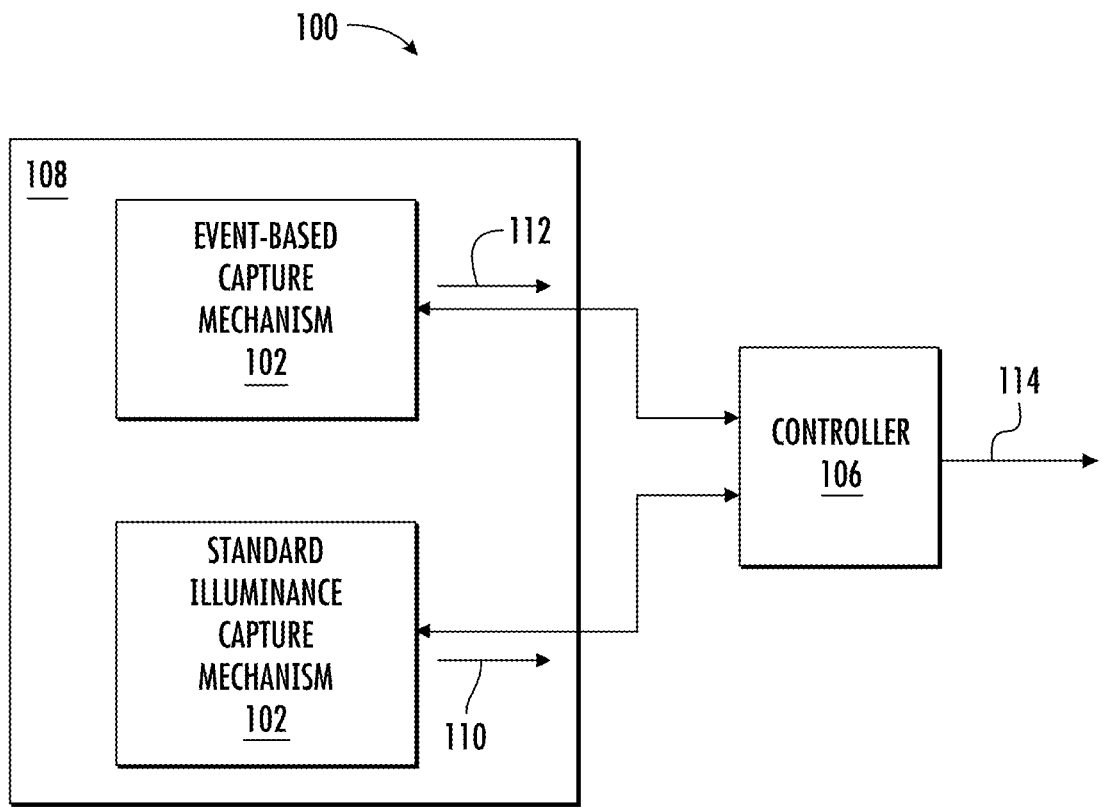
FIG. 1 illustrates a block diagram of an example privacy-preserving apparatus in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with protecting privacy of individuals when operating an image capture device in a surveillance, security, safety monitoring, or similar setting. As understood by those of skill in the field to which the present disclosure pertains, there are numerous example scenarios in which a user may desire to protect the privacy of themselves and others when operating a surveillance image capture device.

For example, with the increased affordability and accessibility of surveillance technology, more and more individuals and businesses are installing surveillance image capture devices on their properties to deter criminal activities, enhance security, or monitor activities. The increasing prevalence of private surveillance image capture devices has raised concern over privacy. For instance, images capturing activity on another person's private property, even if captured inadvertently, may be deemed an invasion of privacy. Similarly, images capturing a person's activity on public property may be considered an invasion of privacy. In addition, imagery from private surveillance image capture devices may be susceptible to eavesdroppers. Eavesdroppers may be able to intercept an image capture stream from a surveillance image capture device, enabling the eavesdropper to access and view imagery from within a private home or business.

One issue with existing surveillance image capture devices is that more information than necessary is transmitted and recorded. For example, some image capture devices are always on, meaning all activity within the field of view, whether on the camera owner's residence, public space, or another private residence, is recorded. Even when wake-up cameras are utilized, capturing imagery data only when an event is detected, the camera records all activity in the field of view. In addition, other motion, such as wind motion, or animal motion, may trigger the recording of the image capture device, capturing unwanted activity in addition to the desired human motion.

In some examples, complex image processing techniques are performed on captured imagery data from surveillance image capture devices previous to storing the captured imagery data. Image processing techniques enable a surveillance system to determine if there is any activity of interest in the captured imagery data before storing the data to a storage device. While such a technique prevents imagery data from being stored unnecessarily, the imagery data is still captured, transmitted, and processed. Since the imagery data is captured and processed, eavesdroppers may still intercept and access the private imagery data, including perhaps, imagery data of a private business, an individual's home, or individuals in public or other private spaces. In addition, significant processing power may be utilized transmitting and processing the captured imagery data.

In some examples, additional sensors such as proximity sensors or indirect time-of-flight (ITOF) sensors may be used to supplement the capture and processing of captured imagery data. For example, a proximity sensor may be connected to a standard image capture device. The proximity sensor may be configured to detect moving objects in the field of view of the capture device. The proximity sensor may then trigger the activation of the image capture device in an instance in which motion in a certain proximity is detected, enabling the capture and transmission of imagery data. However, any motion may potentially trigger the activation of the image capture device, including animal motion, objects moving from wind, or other moving objects within the field of view of the camera, leading to the capture and transmission of unwanted imagery data.

The various example embodiments described herein utilize various techniques to protect the privacy of individuals when capturing imagery data during the operation of a surveillance image capture device. For example, in some embodiments, the capture of imagery data may occur in two phases. In the first phase, an event-based image may be captured using an event-based capture mechanism. An event-based capture mechanism may include a neuromorphic sensor, silicon retina sensor, a dynamic vision sensor, or other similar sensing device that registers and reports local changes in brightness asynchronously, instead of using a classical active pixel sensor (rolling shutter or global shutter) recording absolute brightness level. Since an event-based capture mechanism produces images based on changes in brightness, the identity of individuals and their surroundings may not be identified based on the resulting event-based image. However, the event-based image may enable the classification of objects and specific actions performed, without revealing the actor and the environment.

Once an image from an event-based capture mechanism is received, a processing device (e.g., controller) may utilize image processing algorithms to detect the presence of relevant objects (e.g., humans) or events (e.g., person walking, person running, etc.). Further, the processing device may determine if the event occurs in an area of interest (e.g., the private property of the owner) or outside of an area of interest (e.g., private property of a neighbor). Areas of interest may be defined by a user through a user interface, may be determined using additional proximity sensors, or may be determined automatically.

In the second phase, once an object of interest or an event of interest is detected in a relevant location, a standard illuminance capture mechanism may be activated, revealing identifying information, such as the identity of individual(s) and the surrounding environment (e.g., the camera location). The controller may perform standard image processing techniques to determine relevant information related to the identity and actions performed by the identified individual(s). In an instance in which the identity of the individual(s) is known, and/or the action is not of interest, the standard illuminance capture mechanism may be deactivated. Similarly, upon the conclusion of a detected relevant event, or departure of the object of interest from the field of view of the image capture device, the standard illuminance capture mechanism may be deactivated and capture returned to the event-based capture mechanism.

By utilizing event-based images to identify objects of interest, relevant actions, and/or the location of the objects of interest and/or the relevant events, before activating a standard illuminance capture mechanism, the identity of the individuals within the field of view of the privacy-preserving surveillance camera may be preserved. In addition, once a relevant activity and/or object of interest is identified, and the location of the relevant activity is determined to be within an area of interest, the standard image capture sensor may be enabled, still allowing the identity of the individuals to be determined. By only capturing event-based images, except when relevant objects and events in areas of interest are identified, eavesdroppers are unable to reliably monitor and track activity in and around a private residence or business.

As a result of the herein described example embodiments and in some examples, the privacy of individuals in the field of view of an operating surveillance image capture device may be preserved. In addition, utilizing the techniques described herein may greatly reduce the power consumption and storage requirements of an image capture device in a surveillance setting.

Referring now to FIG. 1, an example privacy-preserving apparatus 100 is provided. As depicted in FIG. 1, the example privacy-preserving apparatus 100 includes an image capture device 108 electrically connected to a controller 106. The image capture device 108 includes an event-based capture mechanism 102 configured to transmit event-based images 112 to the controller 106. The image capture device 108 further includes a standard illuminance capture mechanism 104 configured to transmit standard illuminance images 110 to the controller 106. The controller 106 is configured to receive the event-based images 112 and/or the standard illuminance images 110 and transmit an image capture stream 114 containing imagery data.

As depicted in FIG. 1, the privacy-preserving apparatus includes an image capture device 108. An image capture device 108 may be any device configured to sense characteristics of the light intensity in an environment, and produce a visual output representing the light intensity characteristics. An image capture device 108 may provide a housing to secure and protect the internal components of the image capture device 108, for example, any sensing elements such as the event-based capture mechanism 102 and the standard illuminance capture mechanism 104. In some embodiments, an image capture device 108 may comprise a lens, aperture, shutter and other elements to control the exposure of the internal elements to light in the sensing environment. In some embodiments, the image capture device 108 may include one or more processing devices. A processing device may perform operations on the captured imagery data, including image processing operations. Although depicted external to the image capture device 108 in FIG. 1, in some embodiments, the controller 106 may be disposed within the housing of the image capture device 108. The image capture device 108 is further configured to generate an output representing the light intensity characteristics measured by the internal sensing elements, for example, a series of pixels.

As further depicted in FIG. 1, the image capture device 108 includes an event-based capture mechanism 102. An event-based capture mechanism 102 may be any sensing device configured to generate an electrical output (e.g., event-based image 112) based on the change in flux at an individual sensing element (e.g., pixel). The event-based capture mechanism 102 may comprise a plurality of event-based pixels arranged in a 2-dimensional array. Each event-based pixel comprises a light receiving unit, for example a photodiode, and a comparator. The comparator continuously monitors the photocurrent produced by the photodiode and outputs a signal any time the change in photocurrent over a period of time exceeds a threshold. Thus, the electrical output of an event-based pixel represents the change in flux at an electrically connected photodiode. In some embodiments, the electrical output of an event-based pixel may be binary, for example, a 1 may represent a change from darker to lighter exceeding the threshold, and a 0 may represent a change from light to darker exceeding the threshold.

As further depicted in FIG. 1, an event-based image 112 is generated from the electrical output of the event-based capture mechanism 102 and represents the change in light intensity at each event-based pixel in a 2-dimensional array of event-based pixels, over a period of time. In some embodiments, the electrical output from an event-based pixel may comprise a coordinate, a polarity, and/or a time. A coordinate may be correlated with the x, y location of the event-based pixel in the 2-dimensional array of event-based pixels. The polarity may represent the detected change in light intensity (e.g., from lighter to darker, or from darker to lighter). The time may represent the time at which the change in light intensity was recorded. Utilizing the electrical output, a 2-dimensional event-based image 112 may be constructed.

In some embodiments, an event-based capture mechanism 102 may generate output asynchronously. In such an embodiment, a value is output from an event-based pixel at any point at which the change in light intensity received at the light sensing unit (e.g., flux) is greater than a threshold, a value is output. Still, in some embodiments, changes in light intensity may be stored and read at a regular frequency.

In some embodiments, only pixels that have changed are transmitted as part of an event-based image 112. As such, in a mostly static scene, the size of the image may be drastically reduced. The reduced image size may result in faster processing times when transmitting, storing, analyzing, or otherwise processing event-based images 112. In addition, faster frame rates may be achieved when compared to standard illuminance image 110 capture.

As further depicted in FIG. 1, the example image capture device 108 includes a standard illuminance capture mechanism 104. A standard illuminance capture mechanism 104 may be any sensing device configured to generate an electrical output (e.g., standard illuminance image 110) based on the number of photons received at a light sensing unit over an integration time. A standard illuminance capture mechanism 104 may comprise a plurality of standard illuminance pixels arranged in a 2-dimensional array. In some embodiments, a standard illuminance capture mechanism 104 may include a shutter device, such as a global shutter or rolling shutter. A shutter device may open to expose the underlying standard illuminance pixels for a period of time. The shutter device may then close and the electrical output of each standard illuminance pixel (representing the number of photons received at the light sensing unit) read. In some embodiments, a standard illuminance capture mechanism 104 may comprise a rolling shutter, in which the standard illuminance pixels are read one row at a time.

As further depicted in FIG. 1, a standard illuminance image 110 is generated from the electrical output of the standard illuminance capture mechanism 104 and represents the light intensity received at each standard illuminance pixel in a 2-dimensional array of standard illuminance pixels, over an integration time during which the standard illuminance pixels are exposed to light in the sensing environment. A standard illuminance image 110 comprises one pixel value for each standard illuminance pixel in the array of standard illuminance pixels. As such, any transmitting, storing, analyzing, or otherwise processing standard illuminance images 110 may require additionally processing power. In addition, due to the necessity of an integration time, the time between received images may be slower, resulting in slower frame rates.

Although depicted as physically separate devices in FIG. 1, in some embodiments, the event-based capture mechanism 102 and the standard illuminance capture mechanism 104 may be embodied in a single sensor. For example, in some embodiments, the event-based capture mechanism 102 and the standard illuminance capture mechanism 104 may share resources, such as the light sensing unit.

As further depicted in FIG. 1, the example privacy-preserving apparatus 100 includes a controller 106. A controller 106 is any circuitry comprising hardware, firmware, software, or any combination thereof configured to receive imagery data and perform operations in relation to the imagery data to detect objects, actions, events, and other information contained in the captured imagery data or imagery data stream. As depicted in FIG. 1, the controller 106 may be configured to receive and analyze both standard illuminance images 110 and event-based images 112. In addition, the controller 106 is configured to configure and control the event-based capture mechanism 102 and the standard illuminance capture mechanism 104. For example, a controller 106 may activate and deactivate the event-based capture mechanism 102 and the standard illuminance capture mechanism 104. In an instance in which the event-based capture mechanism 102 and/or the standard illuminance capture mechanism 104 is activated, the pixels are activated, such that the pixel elements receive light, generate an electrical output, and transmit the electrical output to the controller 106 as imagery data. In an instance in which the event-based capture mechanism 102 and/or the standard illuminance capture mechanism 104 is deactivated, imagery data is not being generated, thus, no event-based images 112 or standard illuminance images 110 are produced. In some embodiments, the event-based capture mechanism 102 and/or the standard illuminance capture mechanism 104 may be deactivated such that the pixel circuitry is completely deactivating, in other words, no electrical signals are transmitted to or received from the pixel circuitry. Although depicted as separate from the image capture device 108 in FIG. 1, in some embodiments, the controller 106 may be integrated within the housing of the image capture device 108. A controller 106 may be embodied by one or more computing systems, such as apparatus 200 shown in FIG. 2.

In addition, the controller 106 may include hardware, software, firmware, and/or a combination thereof, supporting various functionality associated with processing the received imagery, including, for example, event-based images 112 and standard illuminance images 110.

In an example embodiment, the controller 106 may perform image processing techniques to prepare the captured imagery data for further processing, for example, by removing optical noise, accentuating features such as edges, determining features incident to identifying objects of interest, calculating feature values incident to recognizing objects represented by the captured image data, and other similar techniques known to a person of ordinary skill in the art.

In some embodiments, the controller 106 may utilize image processing techniques on the processed captured image data to identify objects of interest, for example, a person, and/or actions of interest, for example, a person picking up an object or a person destructing property. In some embodiments, the controller may utilize image processing techniques to determine the locale of an object or action of interest, for example, in relation to pre-determined property lines.

Figure 2:
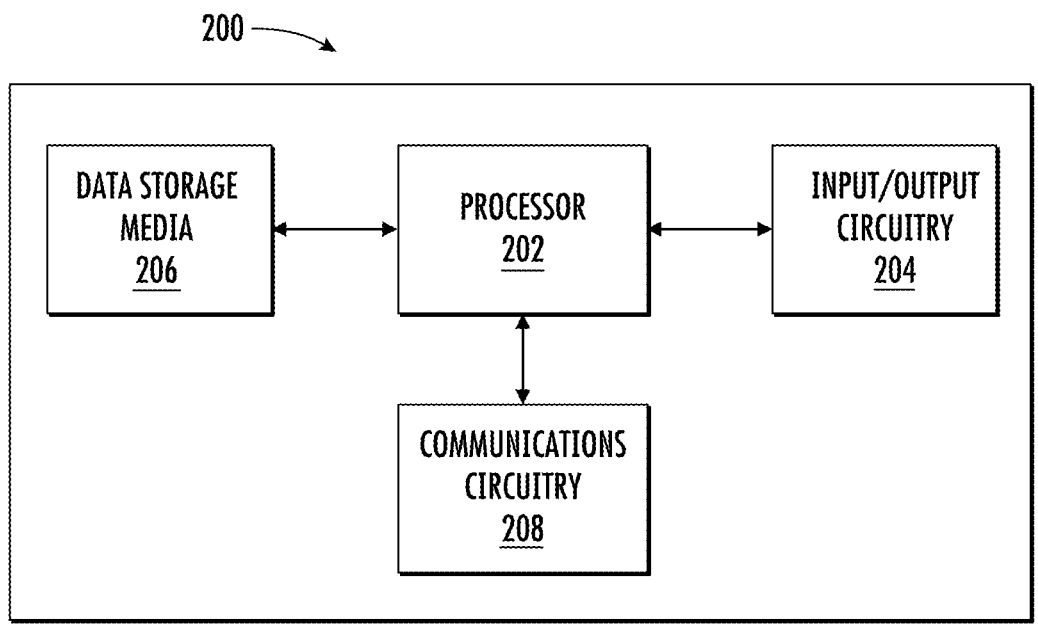
FIG. 2 illustrates an example block diagram showing example components of a controller in accordance with an example embodiment of the present disclosure.

Referring now to FIG. 2, an example apparatus 200 is provided. The apparatus 200 may include processor 202, data storage media 206, input/output circuitry 204, and communications circuitry 208. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the data storage media 206 via a bus for passing information among components of the apparatus. The data storage media 206 is non-transitory and may include, for example, one or more volatile and/or non-volatile memories. In other words, for example, the data storage media 206 may be an electronic storage device (e.g., a computer-readable storage medium). The data storage media 206 may include one or more databases. Furthermore, the data storage media 206 may be configured to store information, data, content, applications, instructions, or the like for enabling the apparatus 200 to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the data storage media 206 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions (e.g., computer program instructions), the instructions may specifically configure the processor 202 to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display, and may comprise a web user interface, a mobile application, a query-initiating computing device, a kiosk, or the like.

In embodiments in which the apparatus 200 is embodied by a limited interaction device, the input/output circuitry 204 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 204 may include at least one of a tactile keyboard (e.g., also referred to herein as keypad), a mouse, a joystick, a touch screen, touch areas, soft keys, and other input/output mechanisms. The processor 202 and/or user interface circuitry comprising the processor may be configured to control one or more functions of one or more user interface elements through computer program instructions (e.g., software and/or firmware) stored on a memory accessible to the processor (e.g., data storage media 206, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Returning to FIG. 1, the example privacy-preserving apparatus 100 further includes an image capture stream 114. The image capture stream 114 is any series of data elements representing visual imagery generated or transmitted by the controller 106 based on the received event-based images 112 and the received standard illuminance images 110. In some embodiments, the image capture stream 114 may be transmitted to an external server (e.g., external server 1288 as further described in relation to FIG. 12) for storage or further analysis. During operation of a privacy-preserving apparatus 100 in a surveillance setting, the image capture stream 114 may primarily comprise event-based images 112. In general, event-based images 112 preserve the privacy of objects and people captured by the image capture device 108. However, in an instance in which an object of interest is detected, the controller 106 may activate the standard illuminance capture mechanism 104 and transmit standard illuminance images 110, or both standard illuminance images 110 and event-based images 112 on the image capture stream 114. Thus, the identity and location of the identified objects of interest may be stored in the external server and or further analyzed.

Figure 3:
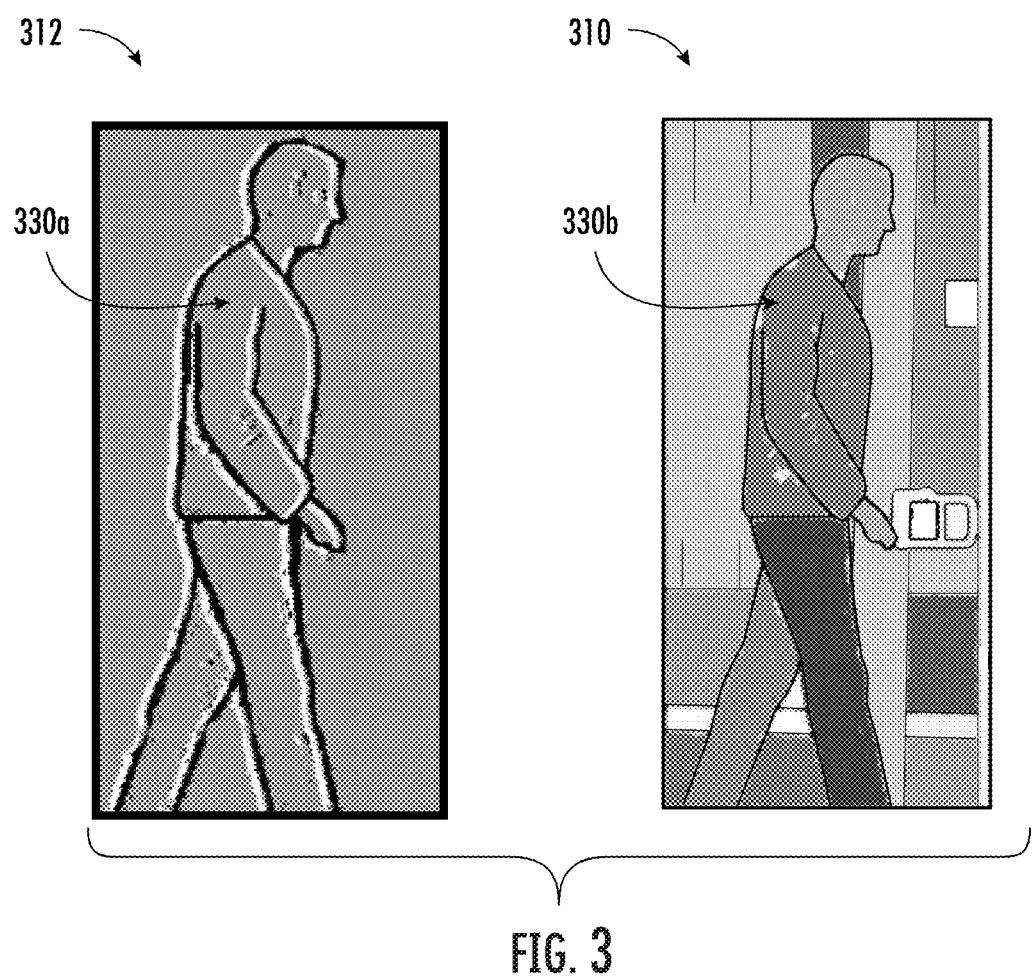
FIG. 3 illustrates an example event-based image from an event-based capture mechanism and an example standard illuminance image from a standard illuminance capture mechanism in accordance with an example embodiment of the present disclosure.

Referring now to FIG. 3, an example event-based image 312 and a standard illuminance image 310 are provided, each displaying an object of interest 330a, 330b.

As depicted in FIG. 3, a privacy-preserving apparatus 100 may capture event-based images 312. Event-based images 312 represent the change in light intensity at a particular location in the field of view of an image capture device (e.g., image capture device 108). In general, an event-based image 312 may indicate motion in a field of view. For example, as an object moves through the scene, obscuring the background as it moves through the scene, the light intensity received at the event-based capture device (e.g., event-based capture mechanism 102) changes quickly, resulting in a transmission of electrical data from the affected event-based pixels. In an instance in which the object remains stationary, the light intensity remains constant, and no electrical data is transmitted from the event-based pixel.

An event-based image 312 further comprises a resolution (e.g., event-based resolution) corresponding to the number of event-based pixels comprising the event-based capture mechanism. For example, in an instance in which the event-based capture mechanism comprises a two-dimensional array of event-based pixels that is 1920 event-based pixels wide and 1080 event-pixels high, the event-based resolution is approximately 2 megapixels.

In general, any number of determinations may be made based on the event-based image 312. For example, objects may be identified and classified. Event-based images 312 enable a controller (e.g., controller 106) to detect objects based on motion. In addition, selected features and characteristics may be utilized to further classify a detected object, for example, whether the object is a human, a cat, a dog, a deer, or another animal. As such, certain objects, such as humans, may be designated as objects of interest and identified in the event-based images 312.

Certain actions and events may also be determined based on one or more event-based images 312, for example, any detectable actions and events involving motion. Such actions and events may include, fighting, kicking, punching, picking up an object, running, crawling, pointing an object, damaging property, vandalizing, meeting with someone, suffering an injury, getting in or out of a car, or other similar actions and events. In some instances, such actions and events may be based on one event-based image 312. Since the event-based image 312 captures changes in intensity, in some embodiments, it may be determined whether an object is moving forward, or backward, how quickly the object is moving, and more based on a single image. Such information may enable determinations regarding actions and events of an object of interest 330a to be made more quickly when compared to a standard illuminance image 310.

However, certain information may not be determined from the event-based image 312. For example, the identity of the object of interest 330a may not be determined. In addition, the identifying characteristics of the location of the object of interest 330a are generally stationary, and thus may not be identified in an event-based image.

As further depicted in FIG. 3, a privacy-preserving apparatus 100 may capture standard illuminance images 310. Standard illuminance images 310 represent the total intensity of light at a particular location in the field of view of an image capture device (e.g., image capture device 108) over a particular integration time, as determined by the number of photons received at a standard illuminance pixel. Standard illuminance images 310 may be configured to produce color images, for example images indicating the red, green, and blue light received at each pixel. In some embodiments, standard illuminance images 310 may be configured to produce grayscale images.

A standard illuminance image 310 further comprises a resolution (e.g., standard illuminance resolution) corresponding to the number of standard illuminance pixels comprising the standard illuminance capture mechanism. For example, in an instance in which the standard illuminance capture mechanism comprises a two-dimensional array of standard illuminance pixels that is 3840 standard illuminance pixels wide and 2160 standard illuminance high, the event-based resolution is approximately 8 megapixels. In some embodiments, the standard illuminance resolution is greater than the event-based resolution.

In general, the privacy of an individual and the location of the individual are no longer preserved in standard illuminance images 310. Standard illuminance images 310 may be utilized to determine the identity of an object of interest 330b (e.g., a person, a pet, etc.). An object of interest 330b may be identified by comparing a set of features to a database; through visibly identifiable clothing, markings, or features; and/or through identification by a person familiar with the object of interest 330b.

As with an event-based image 312, numerous actions and events may be determined based on one or more standard illuminance images 310. For example, actions and events such as actions and events may include, fighting, kicking, punching, picking up an object, running, crawling, pointing an object, damaging property, vandalizing, meeting with someone, suffering an injury, getting in or out of a car, or other similar actions and events. However, because a single standard illuminance image 310 alone contains very little information regarding motion, in general, multiple standard illuminance images 310 are necessary to determine actions and events. Thus, determination of actions and events using standard illuminance images 310 may be slower than determination of actions and events using event-based images 312.

Figure 4:
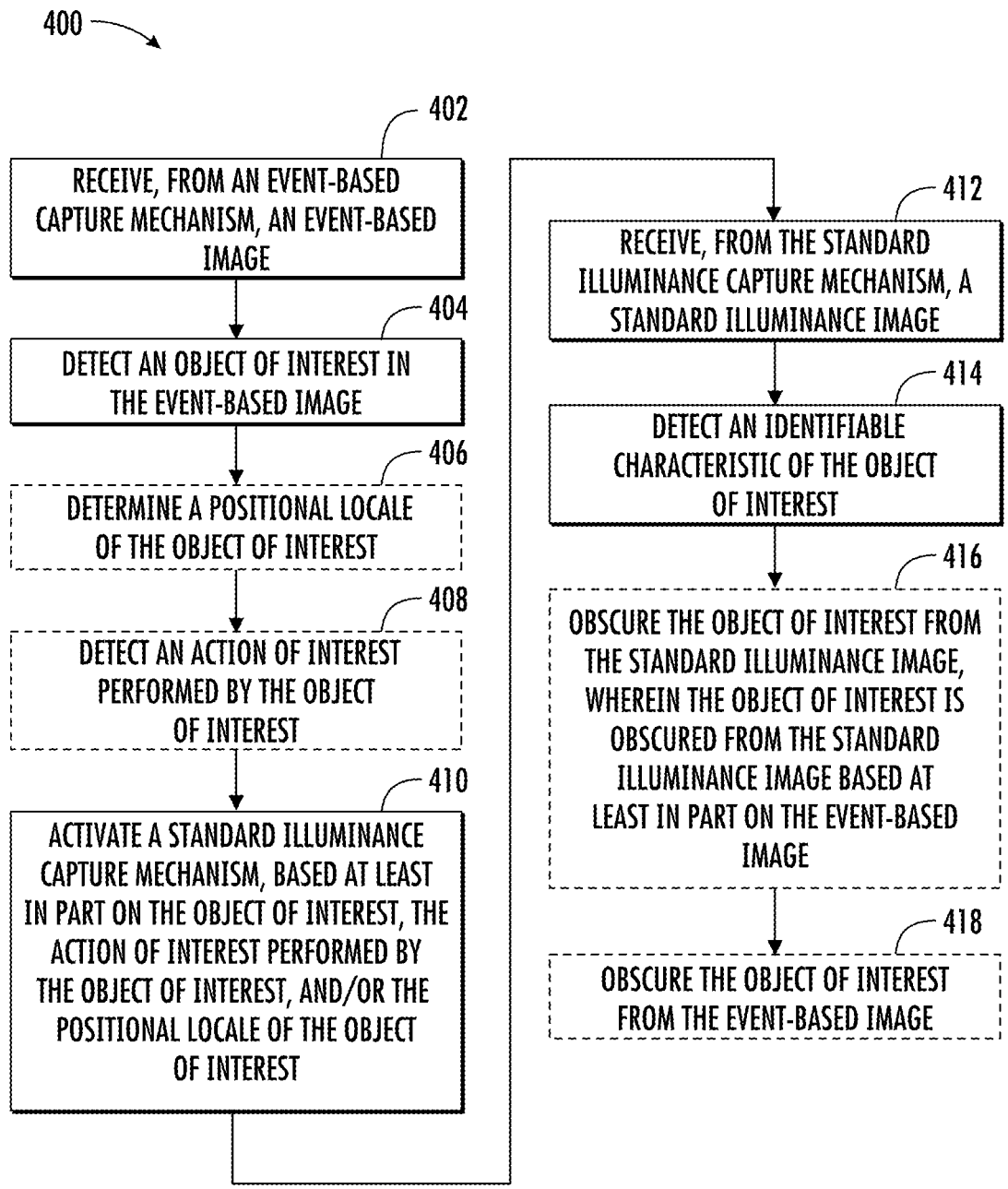
FIG. 4 depicts an example flow chart for preserving privacy while capturing imagery data in a surveillance setting in accordance with an example embodiment of the present disclosure.

Referring now to FIG. 4, an example process 400 for preserving privacy while capturing imagery data is provided. At block 402, the controller (e.g., controller 106) receives, from an event-based capture mechanism (e.g., event-based capture mechanism 102), an event-based image (e.g., event-based image 112, 312). As described herein, an event-based image only relays electronic data related to the change in intensity of light at a particular pixel location. An event-based image thus preserves the privacy of individuals within the field of view of the image capture device housing the event-based capture mechanism until the individual is determined to be of interest.

At block 404, the controller detects an object of interest (e.g., object of interest 330a) in the event-based image. The controller may utilize standard image processing techniques and/or image processing techniques specifically configured for event-based images, to classify an object and detect whether an identified object is an object of interest. Objects in an event-based image may be classified in any number of categories, including humans, animals, pets, dogs, cats, inanimate objects, cars, bicyclists, skateboarders, etc. In some embodiments, one or more classifications of objects may be specified as objects of interest. For example, a user of the privacy-preserving apparatus may specify all humans as objects of interest. In another example, a user may specify all dogs as objects of interest, and so on.

At block 406, the controller determines a positional locale of the object of interest. In some embodiments, a controller may optionally determine a positional locale of an identified object of interest. A positional locale may be the physical location of an object of interest within the scene captured by the image capture device. As further described in relation to FIGS. 8-11, in some embodiments, an image capture device may be positioned to capture various private and public spaces. For example, an image capture device may be positioned to capture a neighboring private space, or a public space. In some embodiments, a user of the privacy-preserving apparatus may specify the bounds of the space to be monitored, as well as neighboring private and public spaces. The controller may be configured to determine in which space the object of interest is located (e.g., positional locale). The positional locale of an item of interest may determine, at least in part whether the privacy of the object of interest is preserved.

At block 408, the controller detects an action of interest performed by the object of interest. In some embodiments, the controller may utilize standard image processing techniques and/or image processing techniques specifically configured for event-based images, to classify specific actions or events. As described herein, actions and events may include any action or event detectable from event-based images utilizing standard image processing techniques. Example actions may include but are not limited to fighting, kicking, picking up an object, running, crawling, pointing an object, damaging property, vandalizing, getting in or out of a car, etc. Example events may include but are not limited to meeting with someone, suffering an injury, certain crimes, explosions, accidents, etc.

At block 410, the controller activates a standard illuminance capture mechanism (e.g., standard illuminance capture mechanism 104), based at least in part on the object of interest, the action of interest performed by the object of interest, and/or the positional locale of the object of interest. A controller may utilize any or all of the detected attributes, including the classification of the object, the positional locale of the object, the action done by or to the object, and/or the event happening with or near the object, to determine if the standard illuminance capture mechanism should be enabled or disabled. For example, a user of a privacy-preserving apparatus may configure the privacy-preserving apparatus to activate the standard illuminance capture mechanism any time a human is on the private property of the user. Thus, a human walking on the private property of the user may trigger the controller to activate the standard illuminance capture mechanism, but a human walking in a public space adjacent the private property of the user would not cause the controller to activate the standard illuminance capture mechanism.

In another example, a user of a privacy-preserving apparatus may configure the privacy-preserving apparatus to activate the standard illuminance capture mechanism any time a human is running the private property of the user. Thus, a human walking on the private property of the user may not trigger the controller to activate the standard illuminance capture mechanism, but a human running on the private property of the user would cause the controller to activate the standard illuminance capture mechanism.

At block 412, the controller receives, from the standard illuminance capture mechanism, a standard illuminance image (e.g., standard illuminance image 110, 310). In an instance in which the controller activates the standard illuminance capture mechanism, the controller begins to receive one or more standard illuminance images from the standard illuminance capture mechanism. As described in relation to FIG. 3, standard illuminance images may be used to particularly identify humans and other objects as well as identify the surrounding environment of the detected object.

At block 414, the controller detects an identifiable characteristic of the object of interest (e.g., object of interest 330*b*). An identifiable characteristic may be any characteristic or set of characteristics of the object of interest used to uniquely identify the object of interest. For example, if the object of interest is a human, the controller may utilize facial features, body shape/type, hair color/length, height, build, clothing, and other physical features as identifiable characteristics of the human. In another example, if the object of interest is a dog, the controller may utilize size, shape, snout, collar, hair length, breed, and other physical characteristics as identifiable characteristics of the dog. To uniquely identify an object of interest, various features may be compared to a database of images or a database listing physical characteristics. In addition, an object of interest may be identified by person familiar with the object of interest.

At block 416, the controller obscures the object of interest from the standard illuminance image, wherein the object of interest is obscured from the standard illuminance image based at least in part on the event-based image. In some embodiments, the object of interest may be identified as a known person or thing. To further protect the privacy of the identified object of interest, the object of interest may be obscured from the standard illuminance image, while the standard illuminance capture mechanism continues to be activated and produce standard illuminance images. Obscuring an object of interest from a standard illuminance image may include blurring the pixels associated with the object of interest, blacking out the portion of the standard illuminance image associated with the object of interest, removing images containing the object of interest, or other similar actions. Obscuring the object of interest from the standard illuminance image may enable the continued capture of a scene including the object of interest while still preserving the privacy of the identified object of interest. For example, in a scene comprising multiple people, and in which one of the persons is identified as a known person to the user of the privacy-preserving apparatus 100, standard illuminance images may continue to capture the activity of the other individuals in the scene while preserving the privacy of the known person.

In some embodiments, the location of the object of interest to be obscured may be provided by the event-based capture mechanism and the associated event-based images.

At block 418, the controller obscures the object of interest from the event-based image. In some embodiments, the object of interest may be obscured from the event-based image, in an instance in which the object of interest is identified as a known object. Obscuring may include removing the pixel data associated with the region occupied by the object of interest. Obscuring the known object from the event-based image may further preserve the privacy of the object of interest. For example, in an instance in which an object of interest is identified as a person living in the home of the surveillance setting the pixels in the event-based image associated with the person may be removed by post-processing of the event-based image. Obscuring the identified person prevents an eavesdropper from confirming whether or not there is a person in the home.

Figure 5:
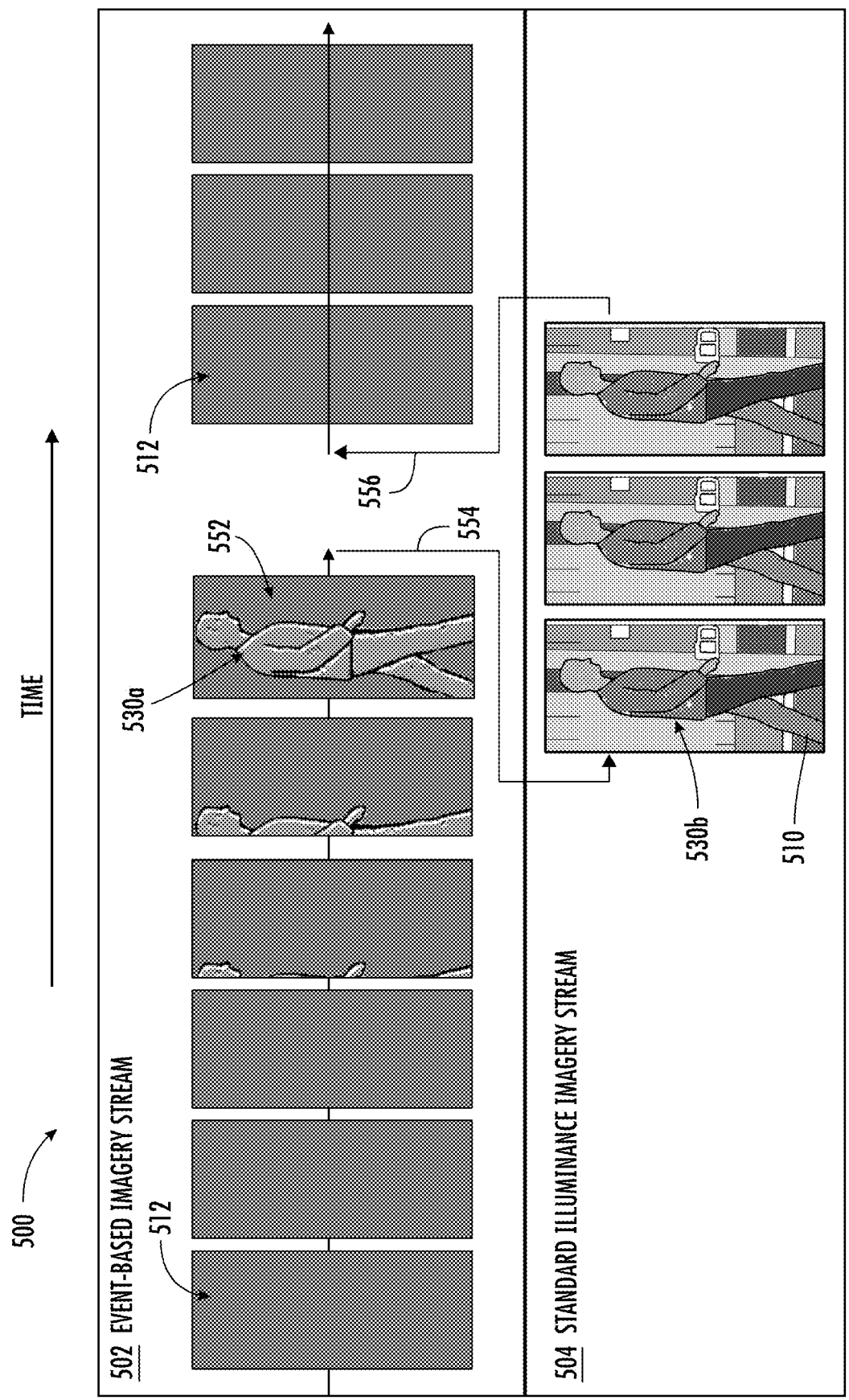
FIG. 5 illustrates an example process for switching between event-based imagery data and standard illuminance imagery data in accordance with an example embodiment of the present disclosure.

Referring now to FIG. 5, an example process 500 for preserving privacy while capturing image data in a surveillance setting is provided. As described herein, a controller 106 is configured to receive event-based images 112 from an event-based capture mechanism (e.g., event-based capture mechanism 102) and standard illuminance images 110 from a standard illuminance capture mechanism (e.g., standard illuminance capture mechanism 104). As depicted in FIG. 5, event-based imagery stream 502 depicts a series of example event-based images 512 received from an image capture device (e.g., image capture device 108) comprising an event-based capture mechanism and a standard illuminance capture mechanism; and standard illuminance imagery stream 504 depicts a series of example standard illuminance images 510 received from the image capture device.

As depicted in the process 500 of FIG. 5, in the first phase of the process, event-based images are received on the event-based imagery stream 502. At event-based image 552, an object of interest 530*a* (e.g., a person walking) is detected. Upon detection of the object of interest 530*a* in the event-based image 552, the path 554 is followed and the controller activates the standard illuminance capture mechanism and begins receiving standard illuminance images 510 on the standard illuminance imagery stream 504. The controller may store or further analyze the standard illuminance images 510 including the object of interest 530*b*. As depicted in FIG. 5, the standard illuminance images 510 provide additional details in relation to the object of interest 530*b*, including identifying characteristics of the object of interest 530*b*. Once the object of interest 530*b* has moved out of the field of view of the image capture device, the path 556 is followed and the controller deactivates the standard illuminance capture mechanism and once again receives and processes event-based images 512.

Figure 6:
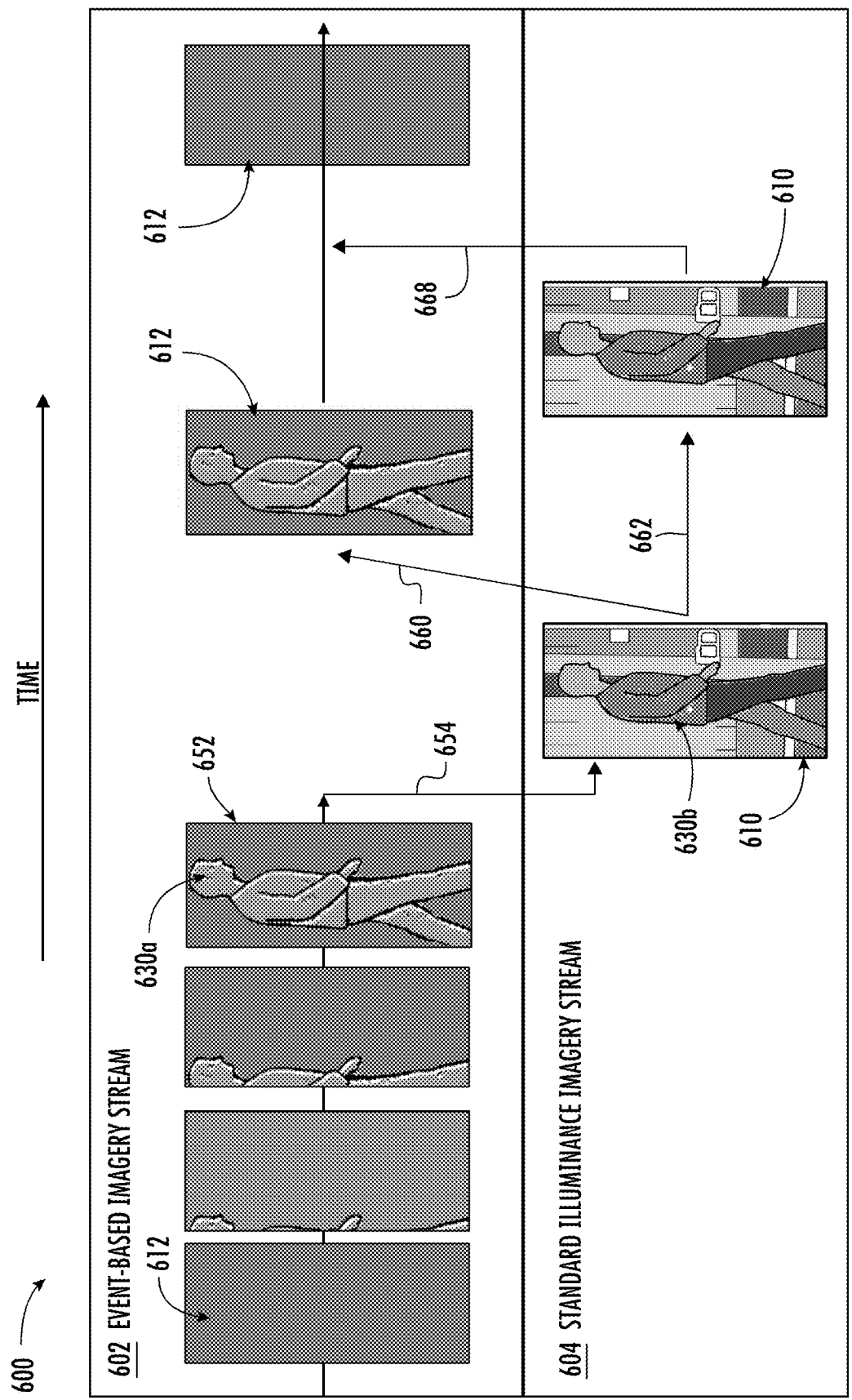
FIG. 6 illustrates an example process for preserving privacy when detecting objects of interest in accordance with an example embodiment of the present disclosure.

Referring now to FIG. 6, an example process 600 for preserving privacy while capturing image data in a surveillance setting is provided. As depicted in FIG. 6, event-based imagery stream 602 depicts a series of example event-based images 612 received from an image capture device (e.g., image capture device 108) comprising an event-based capture mechanism and a standard illuminance capture mechanism; and standard illuminance imagery stream 604 depicts a series of example standard illuminance images 610 received from the image capture device.

As depicted in FIG. 6, an object of interest 630*a* (e.g., person) is first detected by the controller upon receipt of the event-based image 652. In an instance in which the object of interest 630*a* is detected, path 654 is followed and the controller triggers activation of the standard illuminance capture mechanism (e.g., standard illuminance capture mechanism 104) and receipt of standard illuminance images 610 on the standard illuminance imagery stream 604.

In the example process 600, the controller attempts to identify the object of interest 630*b* based on identifiable characteristics (e.g., facial features, body size and shape features, etc.). In some embodiments, the object of interest 630*b* may be identified as a known object of interest and determined to no longer be an object of interest. For example, the object of interest 630*b* may be a known person of the user of the privacy-preserving apparatus. The user of the privacy-preserving apparatus may configure the controller to recognize identified known objects of interest and continue to preserve the privacy of the identified individuals. In an instance in which the object of interest 630*b* is identified as a known object of interest, the path 660 is followed and the standard illuminance capture mechanism is deactivated. Only event-based images 612 are received on the event-based imagery stream 602 until another object of interest, event, or action is detected in an event-based image 612.

In an instance in which the object of interest 630*b* is not identified as a known object of interest, path 662 is followed and the standard illuminance capture mechanism continues to receive, transmit, and/or record standard illuminance images 610. Continued capture of standard illuminance images 610 continues until there is no longer an action or item of interest. For example, the object of interest 630*b* may leave the field of view of the camera, the object of interest 630*b* may enter a positional locale outside of the areas of interest of the user of the privacy-preserving apparatus, and/or the object of interest 630*b* may stop performing an event or action configured as an event or action of interest.

In an instance in which there is no longer an action or item of interest, path 668 is followed and the standard illuminance capture mechanism is deactivated. Only event-based images 612 are received on the event-based imagery stream 602 until another object of interest, event, or action is detected in an event-based image 612.

Figure 7:
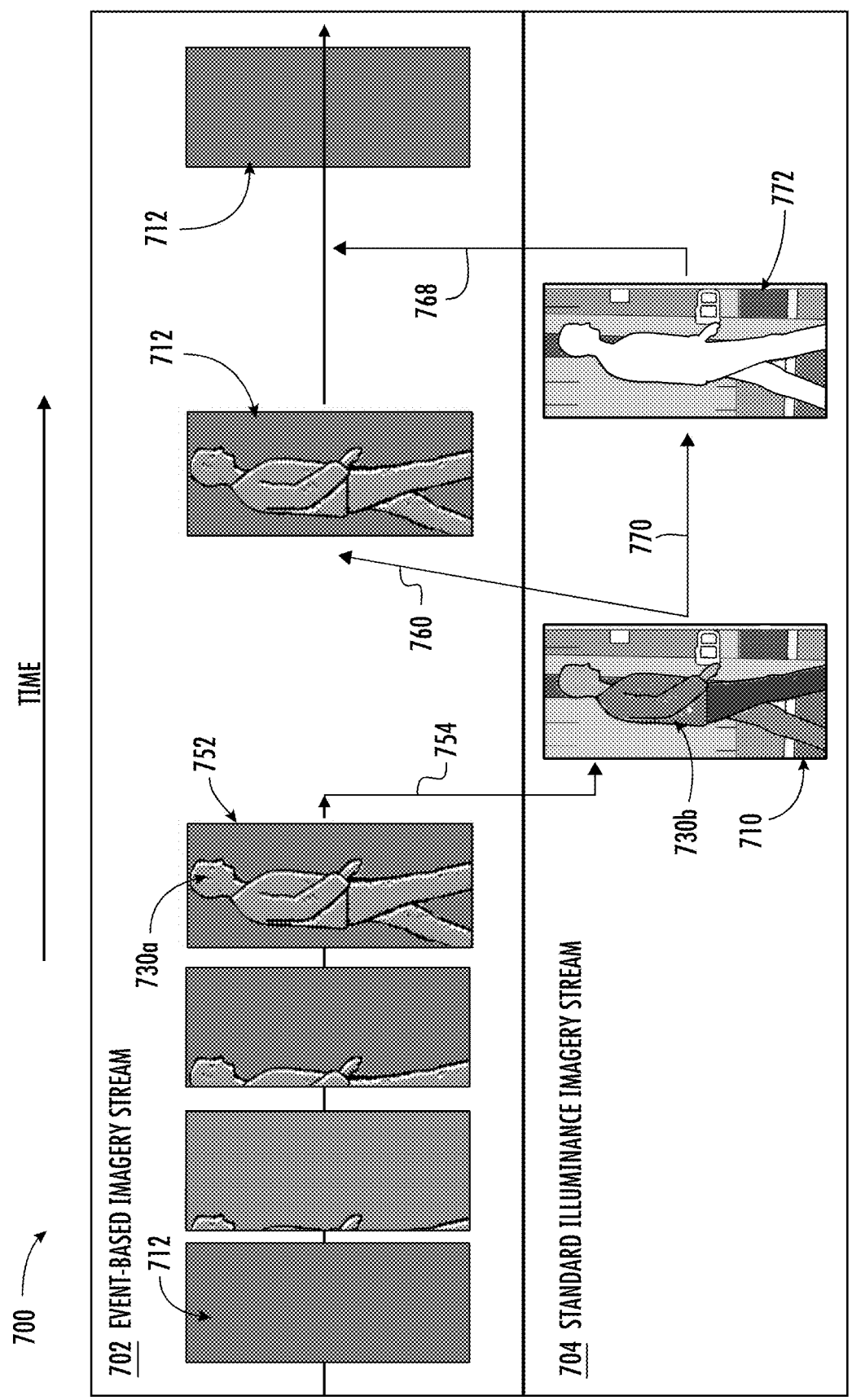
FIG. 7 illustrates an example process for preserving privacy by obscuring identified objects of interest in accordance with an example embodiment of the present disclosure.

Referring now to FIG. 7, an example process 700 for preserving privacy while capturing image data in a surveillance setting is provided. As depicted in FIG. 7, event-based imagery stream 702 depicts a series of example event-based images 712 received from an image capture device (e.g., image capture device 108) comprising an event-based capture mechanism and a standard illuminance capture mechanism; and standard illuminance imagery stream 704 depicts a series of example standard illuminance images 710 received from the image capture device.

As depicted in FIG. 7, an object of interest 730*a* (e.g., person) is first detected by the controller upon receipt of the event-based image 752. In an instance in which the object of interest 730*a* is detected, path 754 is followed and the controller triggers activation of the standard illuminance capture mechanism (e.g., standard illuminance capture mechanism 104) and receipt of standard illuminance images 710 on the standard illuminance imagery stream 704.

In the example process 700, the controller attempts to identify the object of interest 730*b* based on identifiable characteristics (e.g., facial features, body size and shape features, etc.). In some embodiments, in an instance in which the object of interest 730*b* is identified as a known object of interest, the controller may be configured to follow path 760 and the standard illuminance capture mechanism is deactivated. In such an embodiment, only event-based images 712 are received on the event-based imagery stream 702 until another object of interest, event, or action is detected in an event-based image 712.

However, in some embodiments, in an instance in which the object of interest 730*b* is identified as a known object of interest, the controller may be configured to follow path 770 and continues to receive, transmit, and/or record obscured standard illuminance images 772 with the object of interest 730*b* obscured. An object of interest 730*b* may be obscured from an obscured standard illuminance image 772 in a plurality of ways. For example, the controller may utilize standard image processing techniques to determine the bounds of the object of interest 730*b* in subsequent standard illuminance images 710. The controller may utilize the determined bounds of the object of interest 730*b* to obscure the pixels associated with the determined bounds of the object of interest 730*b*. Obscuring pixels may comprise removing the pixels from the standard illuminance images 710, or setting the pixels to a default value (e.g., 255 or 0), as shown in FIG. 7. In some embodiments, the pixels associated with the object of interest 730*b* may be blurred or otherwise altered to obscure the identity of the object of interest 730*b*.

In some embodiments, event-based images 712 may continue to be received from the image capture device. In such an embodiment, the continued location of the object of interest 730*b* may be determined from event-based images 712 and be used to determine the location of the object of interest 730*b* in the corresponding standard illuminance image 710. The location of the object of interest 730*a* in event-based images 712 may be determined utilizing standard image processing techniques and/or techniques modified for use on event-based images 712. Once the bounds of the object of interest are determined from the event-based image 712, the controller may utilize the bounds to obscure the corresponding pixels in the standard illuminance images 710, to generate an obscured standard illuminance image 772. As described herein, obscuring pixels may comprise removing the pixels, setting the pixels to a default value (e.g., 255 or 0), blurring the pixels, or otherwise altering the pixels to obscure the identity of the object of interest 730b. In addition, in some embodiments, the controller may deactivated portions of the standard illuminance mechanism associated with the location of the object of interest 730b. Thus, the pixel values associated with the object of interest 730b are never read or recorded, further preserving the privacy of the known object of interest 730b.

Using the event-based images 712 to determine the location of the object of interest may reduce the processing power necessary to obscure the identity of the object of interest 730b and increase the processing speed in which the object of interest 730b may be obscured. In general, the resolution of event-based images 712 is less than the resolution of standard illuminance images 710. Thus, standard image processing algorithms are operating on a smaller subset of image pixels. In addition, because event-based images 712 are updated asynchronously, the event-based images 712 may be received at faster frame rates.

The continued generation of obscured standard illuminance images 772 continues until there is no longer an action or item of interest. For example, the object of interest 730b may leave the field of view of the camera, the object of interest 730b may enter a positional locale outside of the areas of interest of the user of the privacy-preserving apparatus, and/or the object of interest 730b may stop performing an event or action configured as an event or action of interest. In an instance in which there is no longer an action or item of interest, path 768 is followed and the standard illuminance capture mechanism is deactivated. Only event-based images 712 are received on the event-based imagery stream 702 until another object of interest, event, or action is detected in an event-based image 712.

Figure 8:
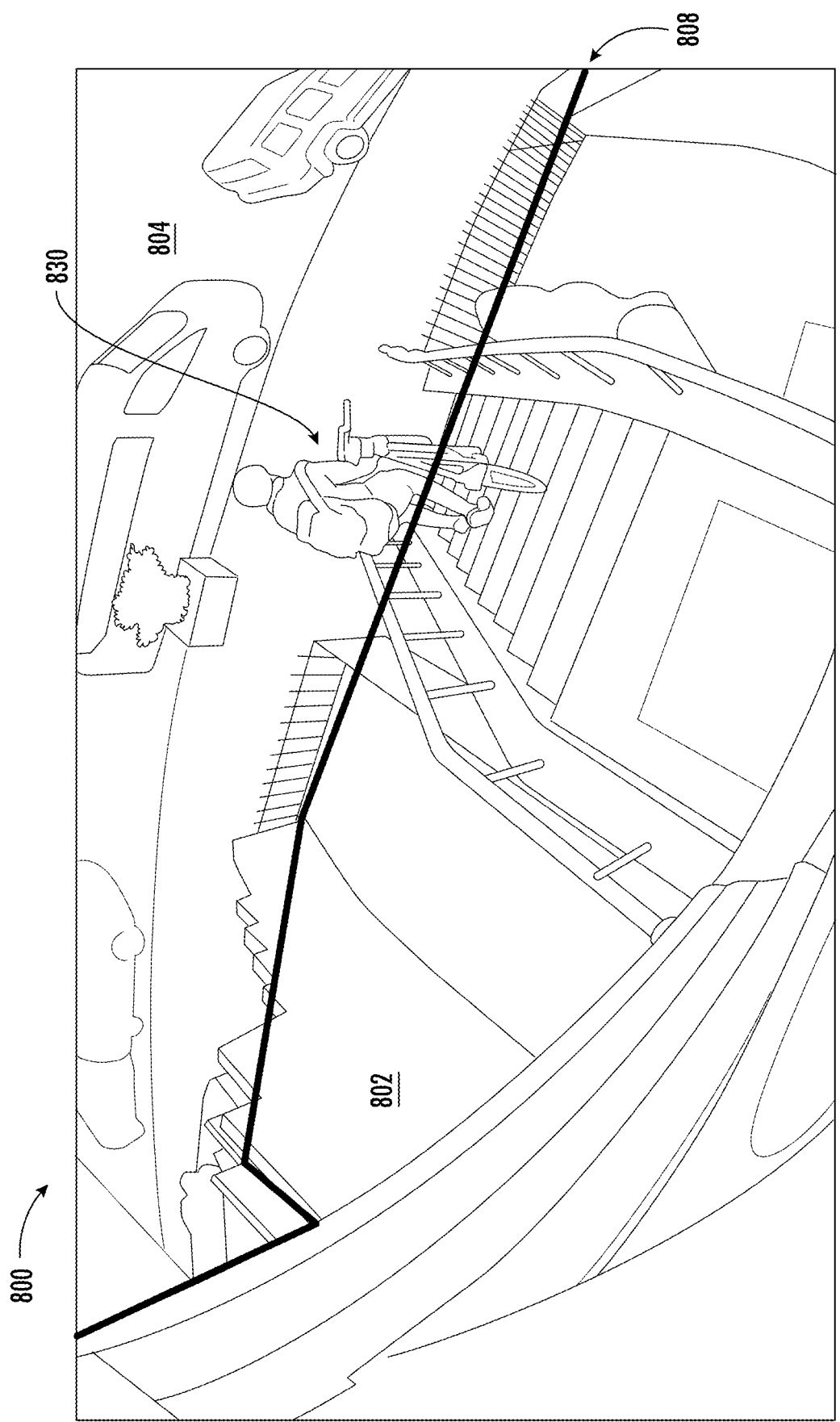
FIG. 8 illustrates an example surveillance setting comprising a public space and a private space in accordance with an example embodiment of the present disclosure.

Referring now to FIG. 8, an example surveillance scene 800 captured by an image capture device (e.g., image capture device 108) is provided. As depicted in FIG. 8, the example surveillance scene 800 captures private space 802 associated with the private space of the user of the privacy-preserving apparatus (e.g., privacy-preserving apparatus 100) and public space 804 associated with the public property. A object of interest 830 (e.g., a person) is further depicted in the example surveillance scene 800 in the private space 802. As further depicted in FIG. 8, a boundary 808 is illustrated overlaying the captured surveillance scene 800.

As depicted in FIG. 8, the example surveillance scene 800 includes a public space 804 and a private space 802. A surveillance scene 800 may be any imagery data representing a scene captured within the field of view of an image capture device (e.g., image capture device 108). An image capture device may be positioned such that a plurality of spaces are captured. For example, a surveillance scene 800 may include imagery data of the private property of the user of the image capture device (e.g., private space); imagery data of the public property such as a road, sidewalk, or park (e.g., public space); imagery data of another private residence, such as a neighboring yard, porch, or house; or any combination thereof.

As further depicted in FIG. 8, the example surveillance scene 800 includes a boundary 808 separating the private space 802 from the public space 804. A boundary 808 may be any indicator dictating to the controller (e.g., controller 106) the border between different spaces captured in the surveillance scene 800. For example, in some embodiments, a boundary may be manually indicated by a user through an interface with the privacy-preserving apparatus. In some embodiments, the boundary 808 may be automatically detected by a privacy-preserving apparatus using image processing techniques. In some embodiments, the boundary may be indicated by physical markings placed in the scene and captured and detected by the privacy-preserving apparatus.

The positional locale of an object of interest 830 may be determined based on the boundary 808 and delimited spaces (e.g., private space 802, public space 804) of a surveillance scene 800. Determinations whether the privacy of an object of interest 830 is preserved may be made based on the positional locale of the object of interest 830. For example, if the positional locale of an object of interest 830 is determined to be in a public space 804, or another person's private space, the privacy-preserving apparatus may preserve the privacy of the captured object of interest 830. However, if the positional locale of the object of interest 830 is in the private space 802 of the user of the privacy-preserving apparatus (as shown in FIG. 8), the standard illuminance capture mechanism (e.g., standard illuminance capture mechanism 104) may be activated and the identity of the object of interest 830 revealed.

Figure 9:
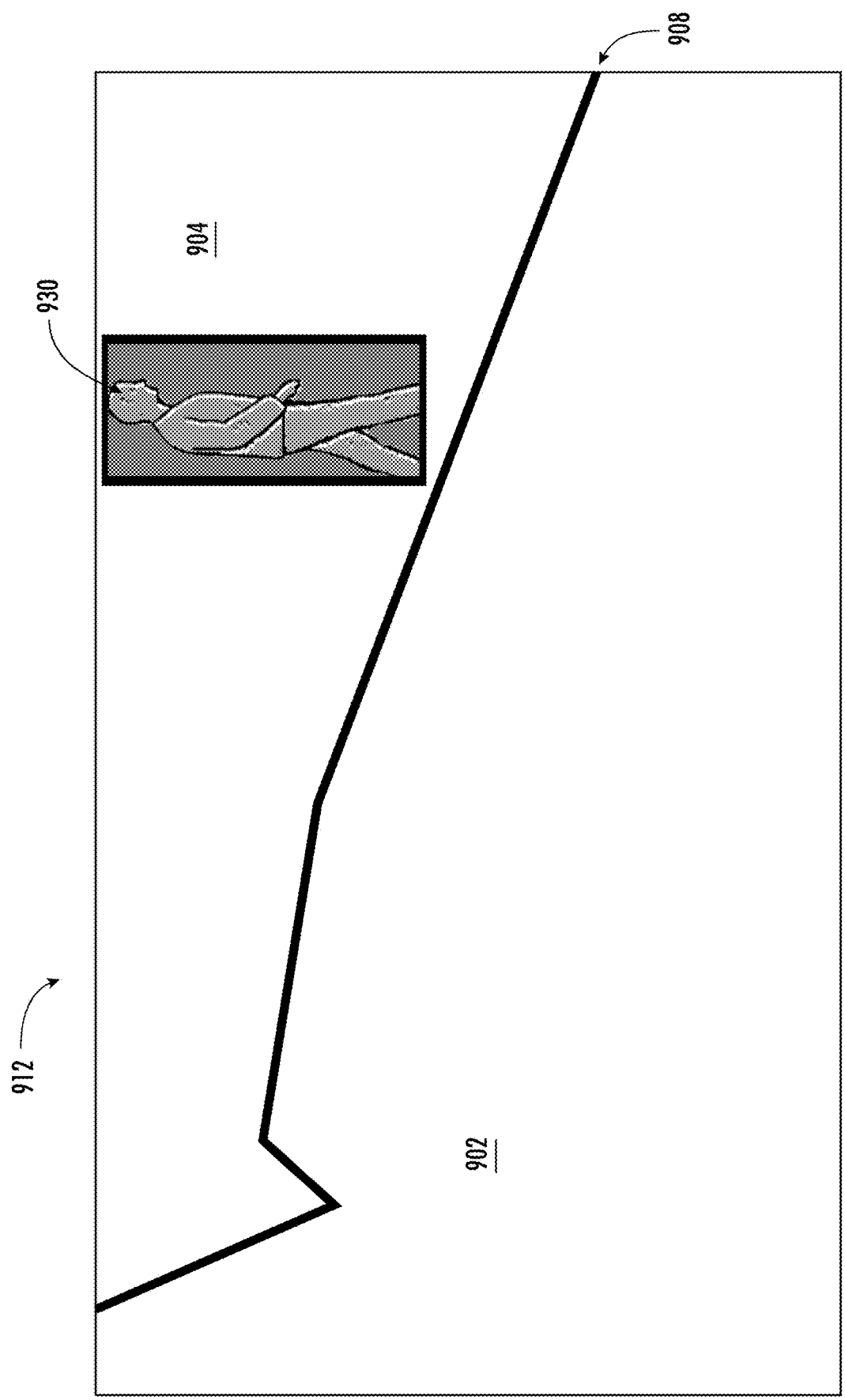
FIG. 9 illustrates an example of an identified object of interest in a public space in accordance with an example embodiment of the present disclosure.

Referring now to FIG. 9, an example event-based image 912 of a surveillance scene similar to the surveillance scene 800 depicted in FIG. 8, is provided. As depicted in FIG. 9, the example event-based image 912 includes an identified object of interest 930. In addition, the example event-based image 912 includes a boundary 908 delimiting a private space 902 from a public space 904.

As described herein, a privacy-preserving apparatus (e.g., privacy-preserving apparatus 100) may preserve the privacy of an object of interest (e.g., object of interest 930) based on the positional locale of the object of interest. A privacy-preserving apparatus may utilize standard image processing techniques to determine the location of an identified object of interest 930 in relation to the boundary 908. As depicted in FIG. 9, the positional locale of the object of interest 930 is within the public space 904 indicated by the boundary 908. Thus, in some embodiments, the identity of the object of interest may be preserved.

Preserving the identity of the object of interest may be done in a plurality of ways. For example, the privacy-preserving apparatus may deactivate or refrain from activating the standard illuminance capture mechanism (e.g., standard illuminance capture mechanism 104). In some examples, the privacy-preserving apparatus may obscure the object of interest in a standard illuminance image (e.g., standard illuminance image 110, 310, 510, 610, 710) in the event the standard illuminance capture mechanism is activated.

Figure 10:
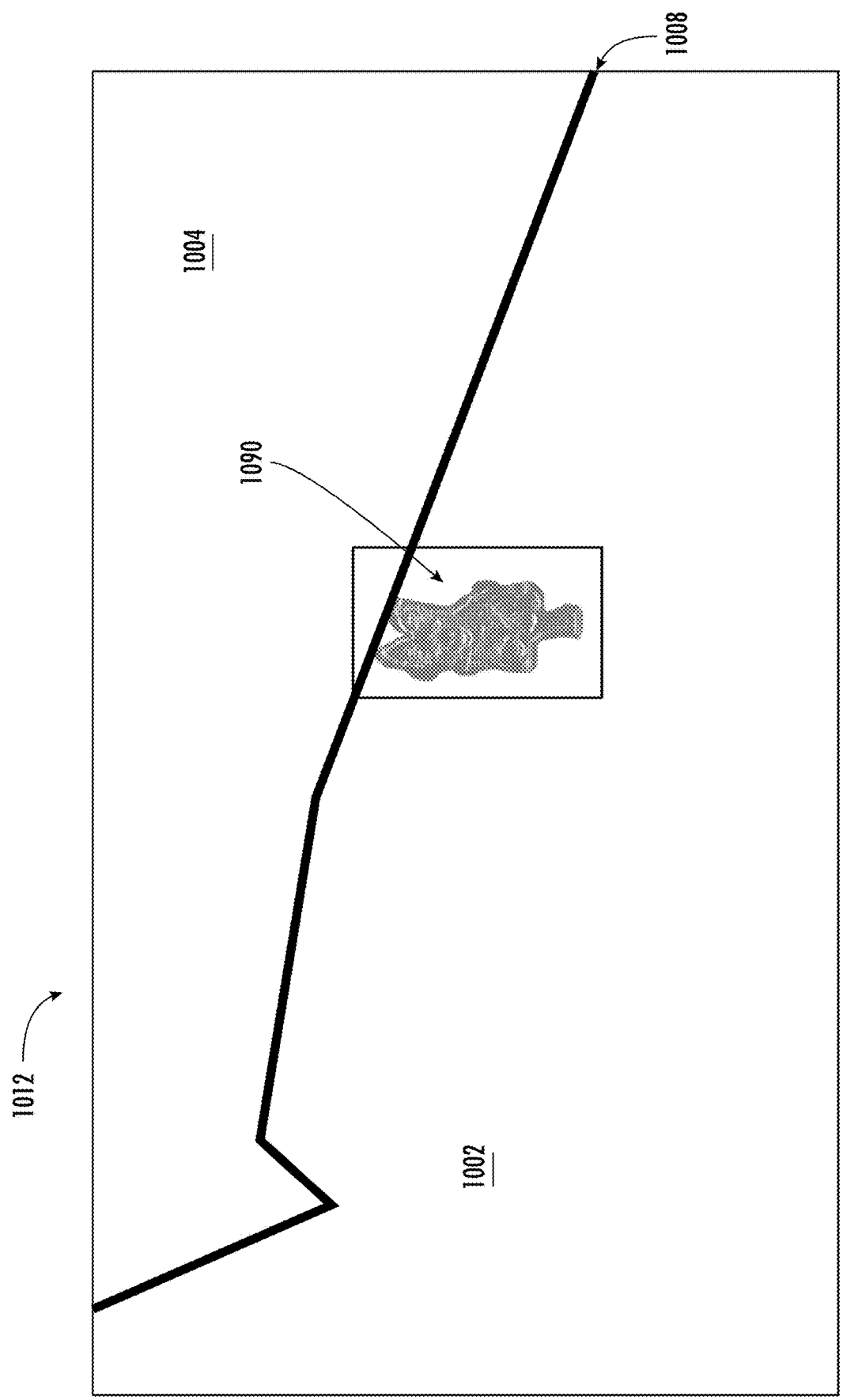
FIG. 10 illustrates an example of an identified object that is not an object of interest in accordance with an example embodiment of the present disclosure.

Referring now to FIG. 10, an example event-based image 1012 of a surveillance scene similar to the surveillance scene 800 depicted in FIG. 8, is provided. As depicted in FIG. 10, the example event-based image 1012 includes an identified object 1090. In addition, the example event-based image 1012 includes a boundary 1008 delimiting a private space 1002 from a public space 1004.

As described herein, a privacy-preserving apparatus (e.g., privacy-preserving apparatus 100) may preserve the privacy of an identified object (e.g., identified object 1090) based on the classification of the identified object. A privacy-preserving apparatus may utilize standard image processing techniques to determine the classification of an identified object 1090 based on identifying features and characteristics of the identified object 1090. As depicted in FIG. 10, the identified object 1090 may be classified, for example, as an animal, or more specifically a dog. In an instance in which the classification of the identified object 1090 is not configured as an item of interest, the privacy-preserving apparatus may refrain from activating the standard illuminance capture mechanism (e.g., standard illuminance capture mechanism 104). Thus, the privacy of the location and scene of the privacy-protecting apparatus, may be preserved in an instance in which an identified object 1090 may not be of interest to the privacy-preserving apparatus.

Figure 11:
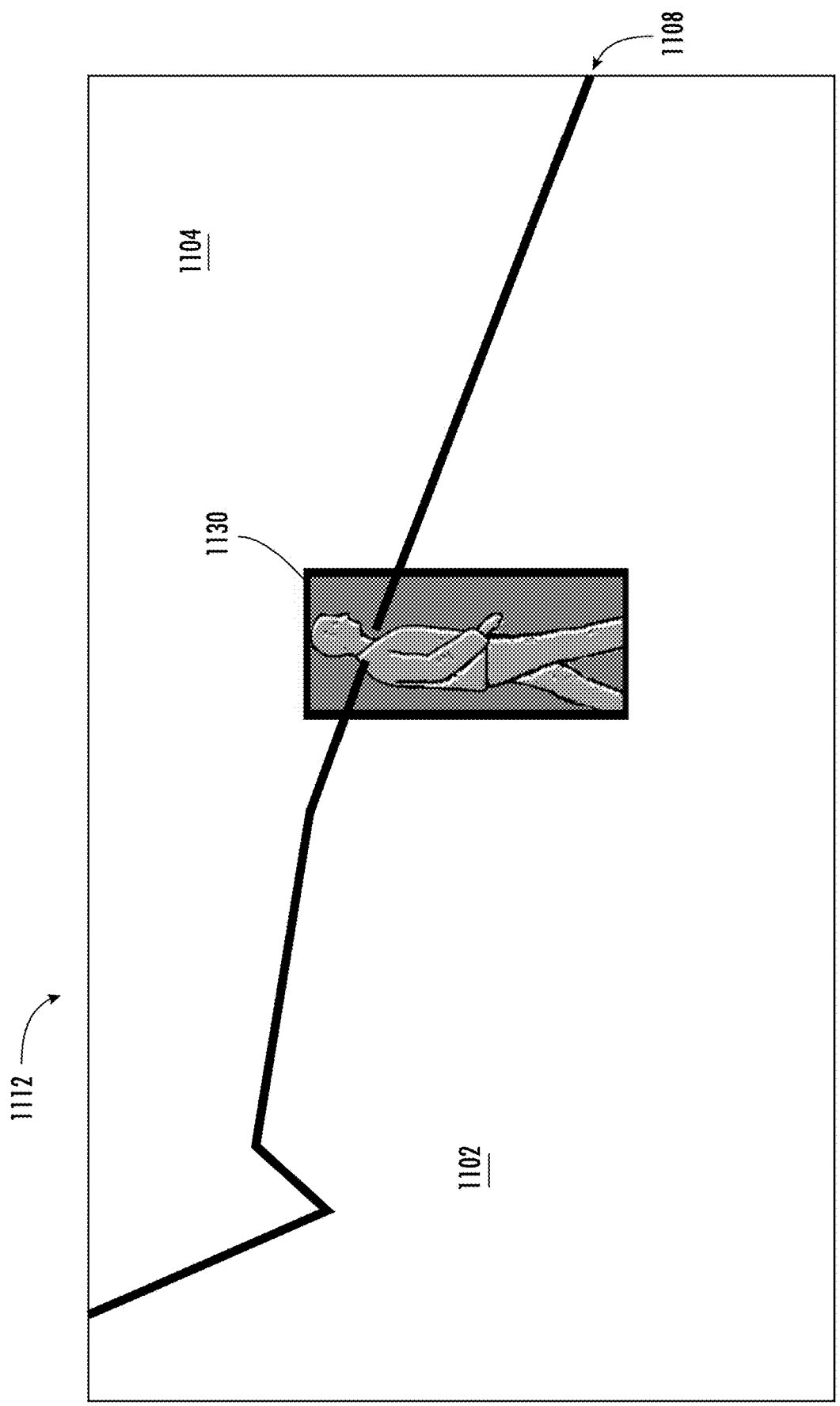
FIG. 11 illustrates an example of an identified object of interest in a private space in accordance with an example embodiment of the present disclosure.

Referring now to FIG. 11, an example event-based image 1112 of a surveillance scene similar to the surveillance scene 800 depicted in FIG. 8, is provided. As depicted in FIG. 11, the example event-based image 1112 includes an identified object of interest 1130. In addition, the example event-based image 1112 includes a boundary 908 delimiting a private space 902 from a public space 904.

As depicted in FIG. 11, the positional locale of the object of interest 1130 is within the private space 1102 indicated by the boundary 1108. Thus, in some embodiments, the privacy-preserving apparatus (e.g., privacy-preserving apparatus 100) may activate the standard illuminance capture mechanism (e.g., standard illuminance capture mechanism 104). Activating the standard illuminance capture mechanism and receiving standard illuminance images (e.g., standard illuminance images 110, 310, 510, 610, 710) may reveal the identity of the object of interest 1130 and the surrounding scene and location. In addition, standard illuminance images may be transmitted and saved, for example, on an external server.

Figure 12:
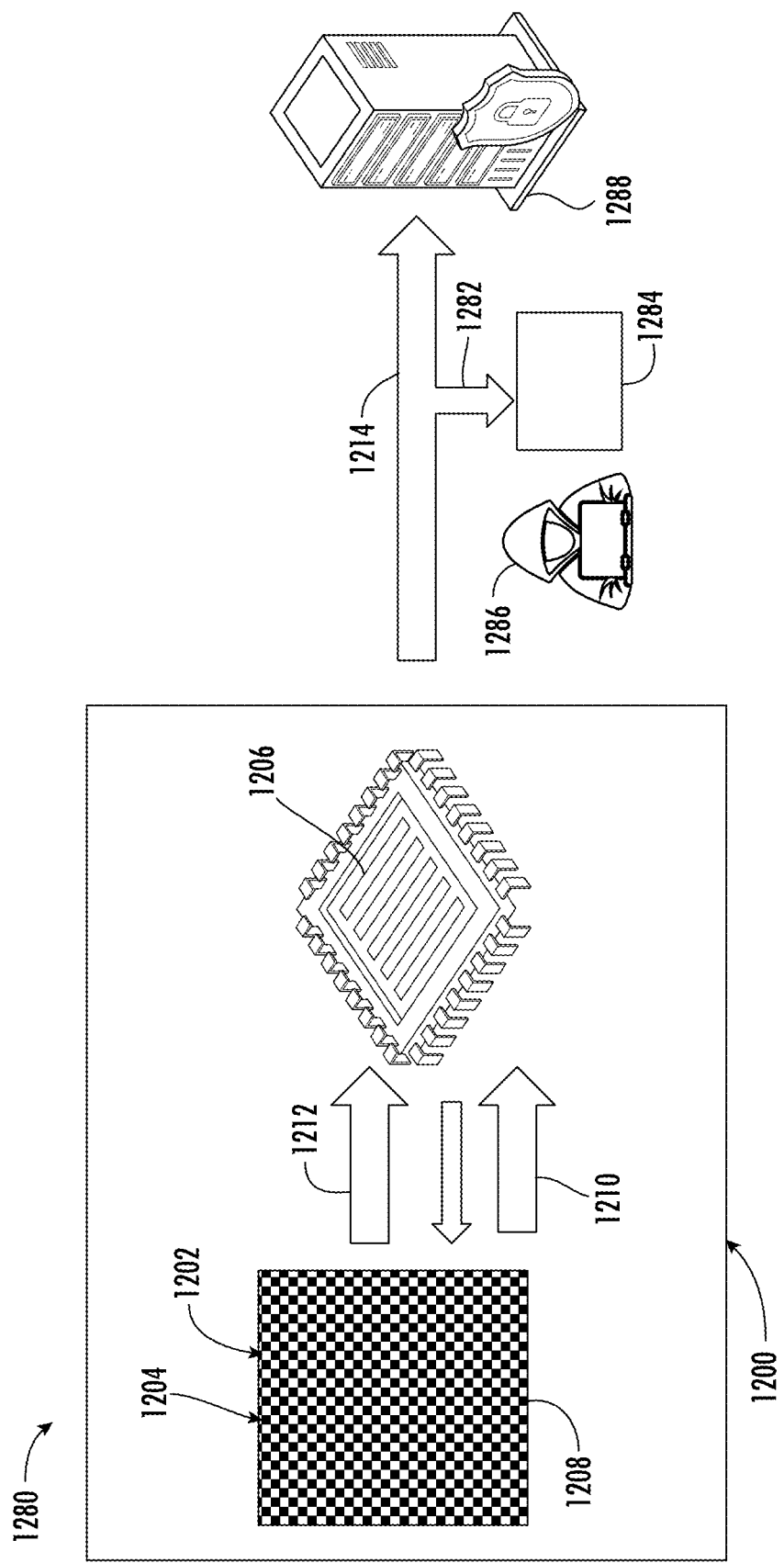
FIG. 12 illustrates an example eavesdropper of the captured imagery data sent to an external server in accordance with an example embodiment of the present disclosure.

Referring now to FIG. 12, an example privacy-preserving surveillance system 1280 is depicted. As depicted in FIG. 12, the example privacy-preserving surveillance system 1280 includes a privacy-preserving apparatus 1200 configured to transmit an image capture stream 1214 to a communicatively connected external server 1288. As further depicted in FIG. 12, an eavesdropper has intercepted a portion of the image capture stream 1214 on an intercepted stream 1282, including one or more intercepted images 1284. In addition, the privacy-preserving apparatus 1200 of the example privacy-preserving surveillance system 1280 includes an image capture device 1208 having an event-based capture mechanism 1202 and a standard illuminance capture mechanism 1204. As depicted in FIG. 12, the image capture device 1208 is configured to transmit event-based images 1212 and standard illuminance images 1210 to a controller 1206. The controller 1206 is further configured to send command and configuration messages to the image capture device 1208 and an image capture stream to the external server 1288.

As depicted in FIG. 12, the privacy-preserving apparatus 1200 of the example privacy-preserving surveillance system 1280 includes an image capture device 1208 (e.g., image capture sensor) comprising both an event-based capture mechanism 1202 and a standard illuminance capture mechanism 1204. As shown in FIG. 12, the image capture device 1208 may be a single sensor device comprising both event-based pixels configured to transmit changes in flux received at an electrically connected photodiode and standard illuminance pixels configured to transmit the total light intensity received at an electrically connected photodiode over an integration time. As further depicted in FIG. 12, the image capture device 1208 is configured to transmit event-based images 1212 and standard illuminance images 1210 to the controller 1206.

As described herein, the image capture device 1208 may receive control and configuration signals from the controller 1206 based on the event-based images 1212 and standard illuminance images 1210 received from the image capture device 1208. For example, a privacy-preserving surveillance system 1280 may be configured to activate only the event-based capture mechanism 1202 during default operation. In an instance in which an object of interest is detected in an event-based image 1212, the controller 1206 may activate the standard illuminance capture mechanism 1204. Further, once the object of interest has left the field of view of the image capture device 1208, the controller 1206 may deactivate the standard illuminance capture mechanism 1204.

As further depicted in FIG. 12, the example privacy-preserving surveillance system 1280 includes an external server 1288. The external server 1288 may be any data storage media configured to store data, content, applications, instructions, or the like. As depicted in FIG. 12, the privacy-preserving apparatus 1200 is in communication with the external server 1288 via a bus (wireless or wired) for passing information. The external server 1288 may store any imagery data received on the image capture stream 1214. In some embodiments, the external server 1288 may be configured to selectively store the imagery data received on the image capture stream 1214 based on the content of the imagery data. For example, the external server 1288 may store imagery data based on the time the imagery data was captured, the detected objects in the imagery data, and so on.

The external server 1288 may additionally provide access to stored imagery data either through an interface on the external server 1288 or through an external computing device. In some embodiments, the external server 1288 may be configured with security features to limit unauthorized access to the stored imagery data.

Although protected on the external server 1288, the stored imagery data may still be susceptible to unauthorized access by an eavesdropper 1286. In addition, an eavesdropper 1286 may intercept imagery data contained on the image capture stream 1214, as depicted in FIG. 12. An eavesdropper 1286 is any individual, computer, or device gaining access to the imagery data on an image capture stream 1214 without authorization. Unauthorized access may be gained by intercepting unencrypted data, hacking passwords, decrypting encrypted data, or other similar mechanism. Due to the privacy protection described herein, the intercepted images 1284, by default, may be event-based images 1212. In addition, standard illuminance images 1210 may not be transmitted in instances when an object of interest is outside of the private space of the user of the privacy-preserving apparatus 1200. Thus, a significant portion of the image capture stream 1214 may be comprised of event-based images. Based on event-based images, an eavesdropper 1286 will be unable to identify objects (e.g., humans) in the event-based image and/or will be unlikely to determine the location of the privacy-preserving apparatus 1200 based on the captured scene or captured landmarks.

Even when standard illuminance images 1210 are transmitted, known objects (such as known persons) and objects of interest without the private space of the user of the privacy-preserving apparatus 1200 may be obscured. Thus, the identity of those objects may be preserved.

While this detailed description has set forth some embodiments of the present invention, the appended claims cover other embodiments of the present invention which differ from the described embodiments according to various modifications and improvements. For example, one skilled in the art may recognize that such principles may be applied to any capture device configured to capture imagery data based on a detected object, action, or event. For example, surveillance cameras; safety monitoring cameras in a business, warehouse, or assembly line; cameras in a private home, doorbell cameras, and other similar camera applications.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus comprising:
   an event-based capture sensor, electrically connected to a controller,
      wherein the event-based capture sensor is configured to generate an event-based image, and
      wherein each event-based pixel of the event-based image is generated asynchronously based on a change in brightness; and
   a standard illuminance capture sensor, electrically connected to the controller,
      wherein the standard illuminance capture sensor is configured to generate a standard illuminance image, and
      wherein each illuminance pixel of the standard illuminance image is generated based a number of photons received at the standard illuminance capture sensor during an integration time;
   wherein the controller comprises at least one processor and at least one memory including program code, the at least one memory and the program code configured to, with the at least one processor, cause the controller to at least:
      deactivate the standard illuminance capture sensor, such that no standard illuminance images are generated;
      receive, from the event-based capture sensor, the event-based image;
      detect an object of interest in the event-based image;
      upon detection of the object of interest, activate the standard illuminance capture sensor, based at least in part on a classification of the object of interest; and
      receive, from the standard illuminance capture sensor, the standard illuminance image.

2. The apparatus of claim 1, further comprising:
   an image capture device, comprising a housing,
      wherein the event-based capture sensor and the standard illuminance capture sensor are disposed within the housing of the image capture device.

3. The apparatus of claim 2, wherein the controller is disposed within the housing of the image capture device.

4. The apparatus of claim 2, further comprising:
   an image capture sensor comprising the event-based capture sensor and the standard illuminance capture sensor.

5. The apparatus of claim 1, wherein the program code is further configured to cause the controller to generate an image capture stream comprising the event-based image and the standard illuminance image.

6. The apparatus of claim 5, wherein at least a portion of the image capture stream is stored on an external server.

7. The apparatus of claim 1, wherein an event-based resolution of the event-based image is less than a standard illuminance resolution of the standard illuminance image.

8. The apparatus of claim 1, wherein the standard illuminance capture sensor is activated in an instance in which the classification of the object of interest is a human.

9. The apparatus of claim 1, wherein the program code is further configured to cause the controller to:
   determine a positional locale of the object of interest relative to a monitored space; and
   deactivate the standard illuminance capture sensor in an instance in which the positional locale of the object of interest is outside of the monitored space.

10. A computer-implemented method for capturing imagery data, the method comprising:
   deactivating a standard illuminance capture sensor, such that no standard illuminance images are generated, wherein the standard illuminance capture sensor is configured to generate a standard illuminance image, and wherein each illuminance pixel of the standard illuminance image is generated based a number of photons received at the standard illuminance capture sensor during an integration time;
   receiving, from an event-based capture sensor, an event-based image,
      wherein each event-based pixel of the event-based image is generated asynchronously based on a change in brightness;
   detecting an object of interest in the event-based image;
   upon detection of the object of interest, activating the standard illuminance capture sensor, based at least in part on a classification of the object of interest; and
   receiving, from the standard illuminance capture sensor, the standard illuminance image.

11. The computer-implemented method of claim 10, further comprising:
   detecting an identifiable characteristic of the object of interest.

12. The computer-implemented method of claim 11, further comprising:
   obscuring the object of interest from the standard illuminance image,
      wherein the object of interest is obscured from the standard illuminance image based at least in part on the event-based image.

13. The computer-implemented method of claim 11, further comprising:
   deactivating the standard illuminance capture sensor based at least in part on the identifiable characteristic of the object of interest.

14. The computer-implemented method of claim 13, further comprising:
   obscuring the object of interest from the event-based image.

15. The computer-implemented method of claim 10, further comprising:
   determining a positional locale of the object of interest relative to a monitored space; and
   deactivating the standard illuminance capture sensor in an instance in which the positional locale of the object of interest is outside of the monitored space.

16. The computer-implemented method of claim 10, further comprising:
   detecting an action of interest performed by the object of interest; and activating the standard illuminance capture sensor, based at least in part on the action of interest.

17. A computer program product for preserving privacy when capturing imagery data, the computer program product comprising at least one non-transitory computer-readable storage medium having computer-readable program code portions stored therein, the computer-readable program code portions comprising an executable portion configured to:
- deactivate a standard illuminance capture sensor, such that no standard illuminance images are generated, wherein the standard illuminance capture sensor is configured to generate a standard illuminance image, and wherein each illuminance pixel of the standard illuminance image is generated based a number of photons received at the standard illuminance capture sensor during an integration time;
- receive, from an event-based capture sensor, an event-based image,
  - wherein each event-based pixel of the event-based image is generated asynchronously based on a change in brightness;
- detect an object of interest in the event-based image;
- upon detection of the object of interest, activate the standard illuminance capture sensor, based at least in part on a classification of the object of interest; and
- receive, from the standard illuminance capture sensor, the standard illuminance image.

18. The computer program product of claim 17, further comprising:
- detecting an identifiable characteristic of the object of interest, and
- deactivating the standard illuminance capture sensor based at least in part on the identifiable characteristic of the object of interest.

19. The computer program product of claim 17, further comprising:
- determining a positional locale of the object of interest relative to a monitored space; and
- deactivating the standard illuminance capture sensor in an instance in which the positional locale of the object of interest is outside of the monitored space.

20. The computer program product of claim 17, further comprising:
- detecting an action of interest performed by the object of interest; and
- activating the standard illuminance capture sensor, based at least in part on the action of interest.

* * * * *